Dec. 18, 1923.                                    1,478,327
                    A. W. DUNN ET AL
         CANE CUTTING APPARATUS TRANSMISSION GEAR
                   Filed Jan. 5, 1922        2 Sheets-Sheet 1
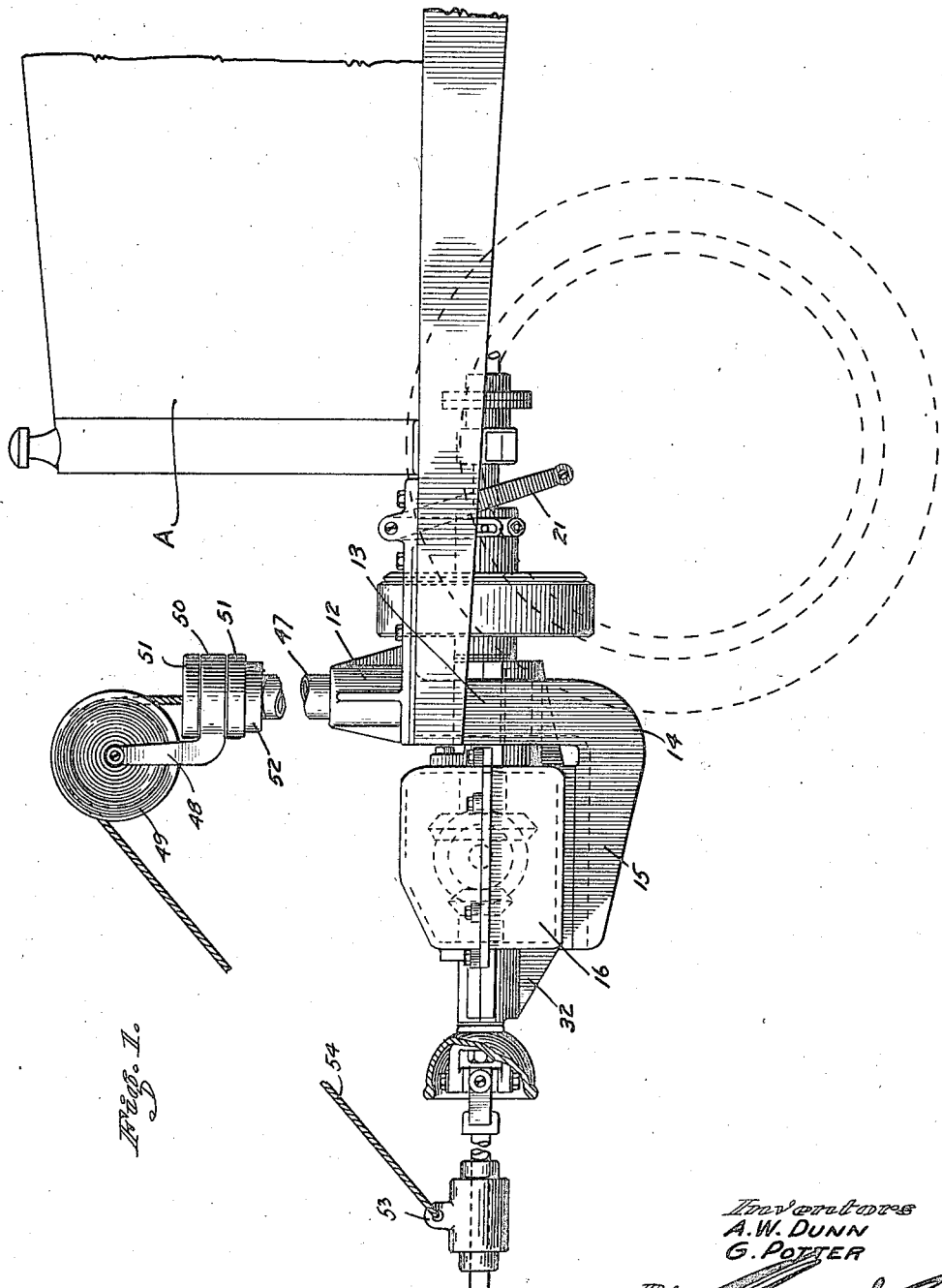
Inventors
A. W. Dunn
G. Potter Dec. 18, 1923. 1,478,327
A. W. DUNN ET AL
CANE CUTTING APPARATUS TRANSMISSION GEAR
Filed Jan. 5, 1922    2 Sheets-Sheet 2
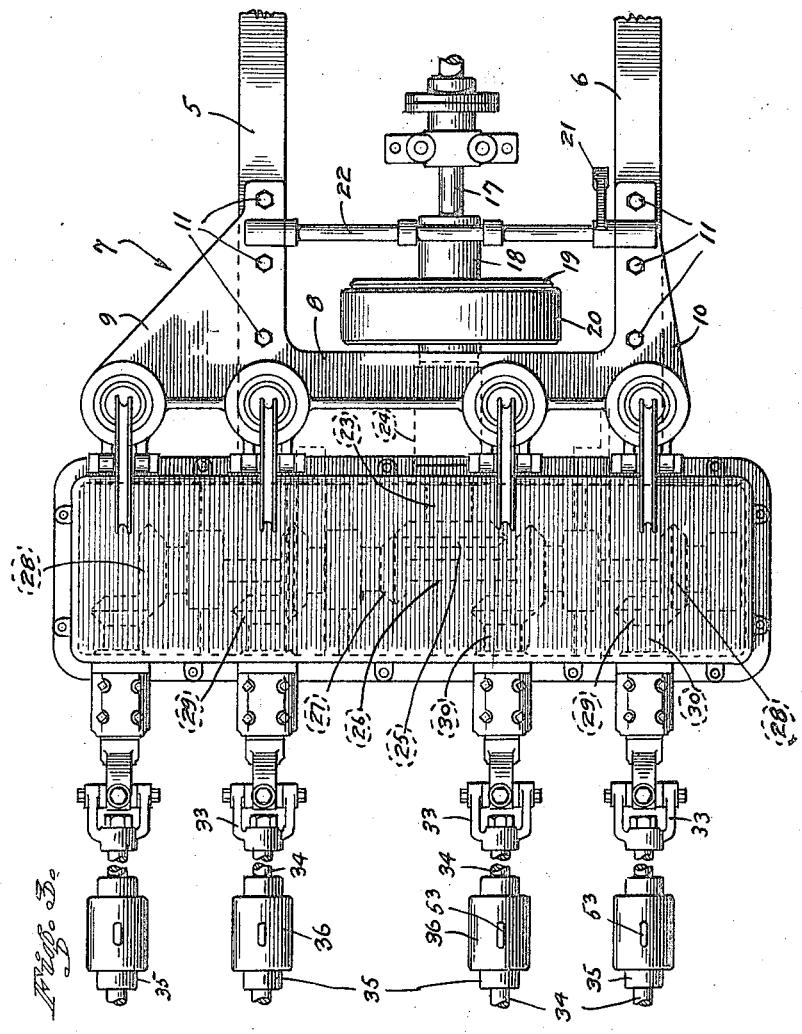
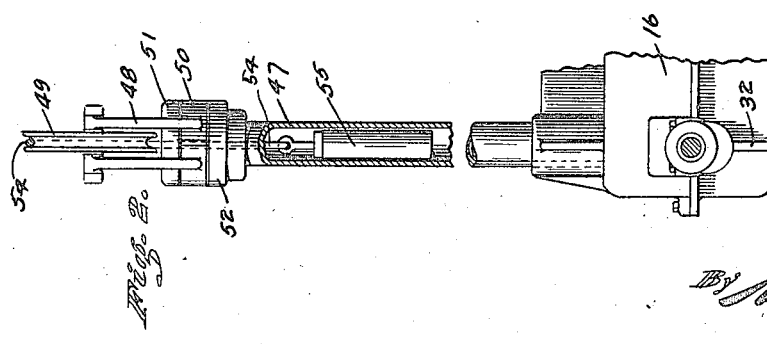
Inventors
A. W. Dunn
G. Potter
Attorneys.

Patented Dec. 18, 1923.

1,478,327

UNITED STATES PATENT OFFICE.

ALFRED W. DUNN, OF HONOMU, TERRITORY OF HAWAII, AND GURDON POTTER, OF SAN FRANCISCO, CALIFORNIA.

CANE-CUTTING-APPARATUS TRANSMISSION GEAR.

Application filed January 5, 1922. Serial No. 527,166.

*To all whom it may concern:*

Be it known that we, ALFRED W. DUNN and GURDON POTTER, citizens of the United States, and residents, respectively, of Honomu, Hawaii, Territory of Hawaii, and San Francisco, in the county of San Francisco and State of California, have invented a new and useful Cane-Cutting-Apparatus Transmission Gear, of which the following is a specification.

Our invention relates in general to cane cutting apparatus and more particularly to a portable or auxiliary transmission gear for driving the flexible shafts or lines to operate our manually controlled cane cutters as shown in our copending application, filed October 24, 1921, Serial No. 509,833.

The principal object of our invention is to provide a self-contained transmission gear which may be readily bolted to the forward end of an ordinary passenger automobile, to be driven by the crank shaft of the engine with a control clutch lever for operatively connecting or disconnecting the transmission, accessible to the driver in the automobile.

Also, a further object is a transmission gear which will offer power connections for a plurality of flexible shafts for operating our cane cutters aforesaid, and further embracing means for counterbalancing the flexible shafts to the cutters all in a unitary structure adapted to easily bolt to the frame structure of a motor vehicle, to which end it is proposed to so construct the attaching and supporting means of the apparatus that it will virtually become a part of the motor vehicle and offer an exceedingly rugged and durable structure, which will be capable of withstanding the heavy use to which the apparatus will be put.

The invention possesses further features which will appear as the description proceeds with reference to the accompanying drawings, in which Figure 1 is a view in side elevation of the front part of a motor vehicle showing the major part of the apparatus as applied thereto; Figure 2 is a view in front elevation, partly in section, of one of the hollow standards for the counter-balancing means; Figure 3 is a plan view of the major part of the apparatus.

Referring now to the drawings in detail, "A" represents a conventional type of motor vehicle of either the tractor type or touring car type, to meet the requirements. The apparatus is preferably mounted to and supported by the horizontal frame members (5) and (6) of the motor vehicle by means of a supporting plate (7) which is shaped so as to virtually straddle the frame members (5) and (6) on the front thereof, with a bridge piece (8) connecting the members and with a relatively wide triangular web (9) on the right hand side and a relatively narrow angular web (10) on the opposite side, with the plate fixed to the frame members (5) and (6) by bolts or the like (11), on the inside edge of these two webs. The plate (7) is made with a plurality of upstanding journals (12) along the front edge of the bridge piece (8), the purpose of which will be presently described. Extending downwardly, as at (13), from the under side of the plate (7) and then bent outwardly, as at (14), to leave a supporting shelf (15) in front of and below the plate, are a plurality of arms each of which provide supporting shelves for mounting the transmission box (16) on the front of the vehicle.

The cranking shaft (17) of the vehicle engine extends forward as is customary, but instead of terminating in an attaching end for the usual manually manipulated crank is keyed within a collar (18), which forms a part of the cone (19) of the clutch (20). Instead of this particular type of clutch, any other practical type may be used. This clutch primarily affords a master clutch for the cane cutting apparatus and may be actuated in the usual manner through a link (21) from a lever not shown but which may be conveniently arranged for manipulation by the auto driver from the seat and which is connected to the link by any suitable means, and with the link keyed or otherwise fixed to and adapted to rock the transverse rod (22) so that the two parts of the clutch may be thrown in and out to interrupt the drive, which is established from the clutch by a shaft (23) which extends forwardly from the clutch (20) through a suitable sleeve or the like (24). The shaft (23) terminates within the transmission box (16) and carries on its extremity a master pinion (25).

The transmission box (16) is an oblong shaped structure divided horizontally so that the top part may be removed for obtaining access to the interior thereof, and journaled longitudinally therein but transversely of the shaft (23) is a shaft (26), the same being mounted with freedom of rotation within the transmission box and carrying co-axially mounted pinions. The pinion (27) is in constant mesh with the master pinion (25) so that the drive may be imparted from the engine through the clutch to the shaft (26). The pinions (28) are in constant mesh with pinions (29) which are presented at right angles thereto and mounted on the ends of shafts (30) which extend through bearings at the front of the transmission box. The bearings are supported to realize a rigid structure by shelf extensions (32) extending from the front of the transmission box, as best shown in Figure 1. Arranged adjacent the trunnions (31) on the shaft extensions therethrough are universal joints (33) of any conventional construction.

The drive is transmitted through these universal joints to rigid shafts (34) which extend through and are free to rotate in sleeves (35) with collars (36) slipped over the same.

One of the primary objects of the invention is to produce an apparatus which will provide separate drives for a plurality of individual cane cutters so that each cutter may be manually manipulated independent of the others with flexible means in the drive so that the cutters may be selectively handled within a radius of the motor vehicle determined by the length of the drive, that is the shafts. For this reason the shafts (34) terminate at a short distance beyond the collars (36) for connection to the flexible shafts of our cane cutters shown in our co-pending application already referred to.

Since the weight of each of the flexible shafts will be considerable, and to prevent them from dragging along the ground for an undue length when in operation, a further feature of the invention resides in providing a counter-balancing arrangement for each drive to the cutter so that the shafts thereof may be practically supported in any horizontal angular plane, to which end it is proposed to mount a hollow standard (47) upon the forward edge of the plate (7) in each of the upstanding journals (12). These hollow standards will be of any desired height and will carry at the upper extremities thereof rotatable upwardly extending bifurcated supports (48) for pulleys (49). The supports are rotatably mounted to the standards by eyes (50) with annular retaining flanges (51) holding the eyes on the sleeves (52) which are slipped over the ends of the standards. Fixed at one end of the eyes (53) on the collars (36) are cables or the like (54) which extend around the pulleys (49) and into the hollow of the standards (47) and suitable counter-balancing weights (55) in the hollow of the standards are attached to the opposite ends of the cables. With this construction, when the shafts are raised the weights will drop in the hollows and hold the shafts in any elevated position, at the same time leaving them free to be pulled downwardly to any angular horizontal plane. Since there is a separate and independent counter-balancing device of this kind for each one of the flexible shafts, each of the lines can become selectively and independently operable.

We claim:

1. An auxiliary transmission gear box adapted to be secured across the forward end frame members of an automobile, a central power shaft projecting therefrom adapted for connection to the auto crank shaft, a transverse shaft within the box geared to the central shaft, and a plurality of forwardly extending stub shafts geared to said transverse shaft available outside of the box for power connections.

2. An auxiliary transmission gear box adapted to be secured across the forward end frame members of an automobile, a central power shaft projecting therefrom adapted for connection to the auto crank shaft, a transverse shaft within the box geared to the central shaft, a plurality of forwardly extending stub shafts geared to said transverse shaft available outside of the box for power connections, and a clutch on said central power shaft with operating means extending therefrom adapted for connection to manual control means accessible from the automobile driver's seat.

3. In an auxiliary transmission gear box adapted for securing to the forward end of an automobile, a power shaft axially arranged with and for connection to the automobile engine shaft, a plurality of power delivery shafts geared thereto and projecting forwardly from the box parallel with the power shaft and in the same plane therewith.

4. An auxiliary transmission gear box adapted to be secured transversely to the forward end of an automobile, a central power shaft projecting therefrom adapted for connection to the automobile engine shaft, a plurality of power delivery shafts operatively connected to the power shaft projecting forwardly from the box with universal couplings thereon, a series of tubular standards adjacent the box, a pulley carried by each standard, weights loosely disposed within the standards, and flexible devices secured at one end each, respectively, to the weights passing over the pulleys with the other ends supporting, respectively, the power delivery shafts beyond the universal joints.

5. A bracket adapted to be secured to and across the forward end frame members of an automobile, said bracket having a depressed shelf, a transmission gear box thereon with a drive shaft projecting therefrom adapted for connecting to the automobile engine shaft, gearing therein operatively connected to said drive shaft, a plurality of stub shafts operated by the gearing and projecting forwardly out of the box, universal joints on said stub shafts, and shaft connection means beyond the universal joints for connection to further extending shafts, a series of upwardly projecting tubular members carried by the bracket, pulleys at the top of the tubular members, and flexible devices secured to the shaft connection means passing over the pulleys and connected to counterweights positioned within the tubular members.

ALFRED W. DUNN.
GURDON POTTER.